United States Patent
Ferreira et al.

(10) Patent No.: US 6,605,333 B2
(45) Date of Patent: Aug. 12, 2003

(54) FLOOR MAT HAVING BOTTOM SURFACE OF CONCAVE SECTIONS AND NUBS

(75) Inventors: Fernando A. Ferreira, Bristol, RI (US); Antero Ferreira, Bristol, RI (US); Stephen P. Neri, Hope Valley, RI (US)

(73) Assignee: Lund International, Inc., Anoka, MN (US)

( * ) Notice: Subject to any disclaimer, the term of this patent is extended or adjusted under 35 U.S.C. 154(b) by 310 days.

(21) Appl. No.: 09/804,019

(22) Filed: Mar. 12, 2001

(65) Prior Publication Data

US 2001/0020316 A1 Sep. 13, 2001

Related U.S. Application Data

(62) Division of application No. 09/193,236, filed on Nov. 17, 1998, now Pat. No. 6,221,298.

(51) Int. Cl.[7] .................... B32B 3/30; A47L 23/22; A47G 27/02
(52) U.S. Cl. ............... 428/95; 428/156; 428/167; 428/169; 428/172; 15/216; 15/217; 296/97.23
(58) Field of Search ................. 428/95, 156, 167, 428/169, 172; 296/97.23; 15/215, 216, 217

(56) References Cited

U.S. PATENT DOCUMENTS

| | | | |
|---|---|---|---|
| 1,880,430 A | 10/1932 | Furnas | |
| 1,887,403 A | 11/1932 | Evans | |
| 2,076,122 A * | 4/1937 | Duryee | 428/167 |
| 2,082,918 A | 9/1937 | Wilhelmy | |
| 2,301,125 A | 11/1942 | Kramp et al. | |
| 2,499,565 A | 3/1950 | Booth | |
| D171,301 S * | 1/1954 | Kravitz | D6/583 |
| 2,763,028 A | 9/1956 | Blake | |
| 2,996,150 A * | 8/1961 | Cassem | 184/106 |
| 3,165,569 A | 1/1965 | Bright | |
| 3,387,215 A * | 6/1968 | Stata | 324/76.32 |
| 3,471,601 A | 10/1969 | Goetgheluck | |
| 3,488,081 A * | 1/1970 | Nolen | 296/97.23 |
| 3,555,619 A | 1/1971 | Bucy | |
| 3,577,581 A * | 5/1971 | Stata | 15/215 |
| 3,648,320 A | 3/1972 | Woolley | |
| 3,822,857 A | 7/1974 | Tanie | |
| 3,919,445 A | 11/1975 | Smarook | |
| 3,930,084 A | 12/1975 | Shields | |
| 3,983,657 A | 10/1976 | Klein | |
| 4,174,991 A | 11/1979 | Reuben | |
| 4,361,614 A * | 11/1982 | Moffitt, Jr. | 428/138 |
| 4,403,009 A | 9/1983 | Onderak et al. | |
| 4,432,928 A | 2/1984 | Barnard et al. | |
| 4,464,326 A | 8/1984 | Nishihira | |
| 4,465,720 A | 8/1984 | Bell et al. | |

(List continued on next page.)

*Primary Examiner*—Cheryl A. Juska
(74) *Attorney, Agent, or Firm*—Merchant & Gould P.C.

(57) ABSTRACT

The present invention provides apparatuses and methods for producing molded products such as floor mats, including automotive floor mats. In one embodiment, a molding process is provided for producing a molded product using a mold having a lower plate and an upper plate. The molding process includes steps of filling a first cavity of the lower plate with a liquid molding material of a first color, placing the upper plate on top of the lower plate such that a convex portion of the upper plate extends into the first cavity of the lower plate and contacts the molding material in the lower plate, and curing the liquid molding material.

20 Claims, 17 Drawing Sheets

U.S. PATENT DOCUMENTS

| | | | |
|---|---|---|---|
| 4,468,910 A | | 9/1984 | Morrison |
| 4,491,556 A | | 1/1985 | Fujii et al. |
| 4,513,991 A | | 4/1985 | Renaud |
| 4,533,585 A | * | 8/1985 | Holden ............... 428/116 |
| 4,692,364 A | | 9/1987 | Altus |
| 4,738,814 A | | 4/1988 | Bowles et al. |
| 4,758,457 A | | 7/1988 | Altus |
| 4,835,030 A | | 5/1989 | Squier et al. |
| 4,892,767 A | * | 1/1990 | Freissle ............... 428/52 |
| 4,973,505 A | * | 11/1990 | Bielous ............... 428/44 |
| D313,789 S | * | 1/1991 | Thundercloud ........... D12/203 |
| 5,061,430 A | | 10/1991 | Lang |
| 5,094,601 A | | 3/1992 | Sparrow et al. |
| D325,555 S | * | 4/1992 | Primeau ............... D12/203 |
| 5,154,961 A | | 10/1992 | Reuben |
| 5,215,348 A | * | 6/1993 | Wen-Hwang ........... 296/97.23 |
| 5,223,274 A | | 6/1993 | Delgrange et al. |
| 5,308,570 A | | 5/1994 | Hara et al. |
| 5,326,523 A | | 7/1994 | Güstävel et al. |
| 5,358,768 A | * | 10/1994 | Wiley, III ............... 428/95 |
| 5,362,544 A | | 11/1994 | Reuben |
| 5,380,480 A | | 1/1995 | Okine et al. |
| 5,449,285 A | | 9/1995 | Choiniere et al. |
| 5,476,563 A | | 12/1995 | Nakata |
| 5,501,757 A | | 3/1996 | Takagaki |
| 5,529,824 A | | 6/1996 | Walendy et al. |
| 5,534,208 A | | 7/1996 | Barr et al. |
| 5,554,333 A | | 9/1996 | Fujiki |
| 5,620,546 A | | 4/1997 | Reuben |
| 5,695,696 A | | 12/1997 | Hensler et al. |
| 5,725,926 A | | 3/1998 | Wang |
| 5,759,464 A | | 6/1998 | Matsumoto et al. |
| 5,761,867 A | * | 6/1998 | Carling ............... 52/386 |
| 5,763,039 A | * | 6/1998 | Staubs ............... 428/95 |
| 5,776,583 A | | 7/1998 | Peyton |
| 5,780,074 A | | 7/1998 | Blonigen et al. |
| 5,789,033 A | | 8/1998 | Bertschi et al. |
| 5,834,091 A | | 11/1998 | Irazabal |
| 6,221,298 B1 | * | 4/2001 | Ferreira et al. ............... 264/243 |
| 6,296,733 B1 | * | 10/2001 | Hudkins et al. ............... 156/245 |
| 6,382,350 B1 | * | 5/2002 | Jezewski et al. ............... 181/290 |
| 2002/0114926 A1 | * | 8/2002 | Malpass et al. ............... 428/156 |

* cited by examiner

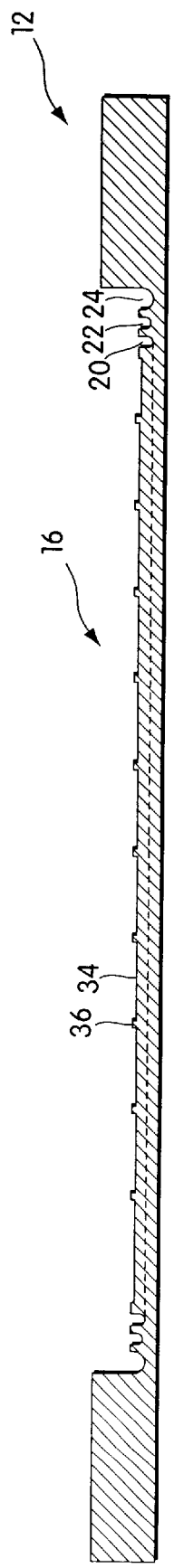
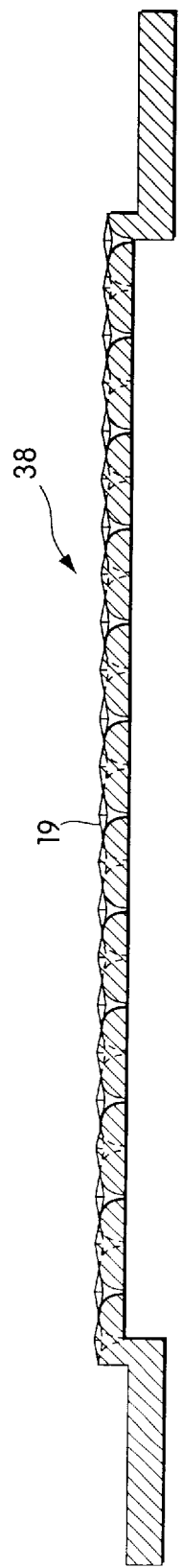
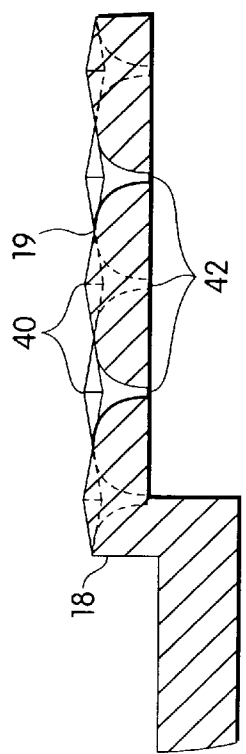

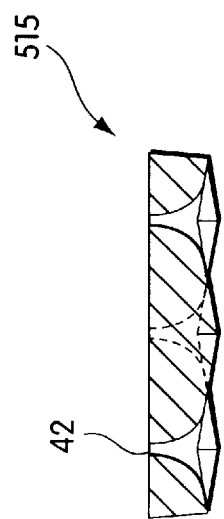
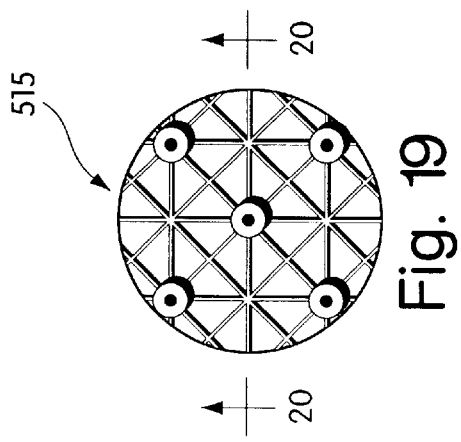
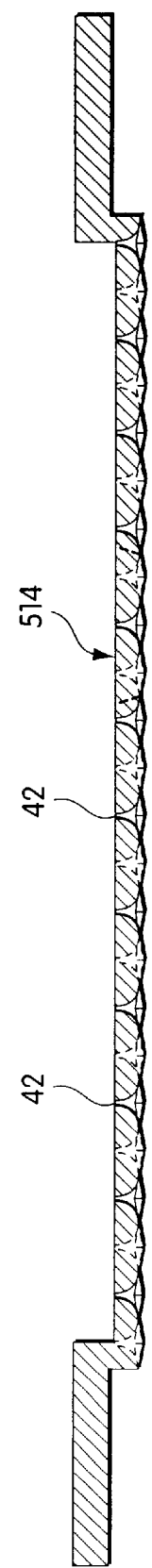

FLOOR MAT HAVING BOTTOM SURFACE OF CONCAVE SECTIONS AND NUBS

CROSS-REFERENCE TO RELATED APPLICATION

This application is a divisional of U.S. patent application Ser. No. 09/193,236 filed Nov. 17, 1998 now U.S. Pat. No. 6,221,298.

FIELD OF THE INVENTION

The present invention relates generally to a method and apparatus for manufacturing molded products. More specifically, embodiments of the present invention relate to an open-pore molding process and apparatus for manufacturing molded products. In addition, embodiments of the present invention are directed to molded products, including floor mats, manufactured using processes of the present invention.

BACKGROUND OF THE INVENTION

Open-pore or open cavity molding processes for manufacturing molded rubber or plastic products are known. In a typical prior art open cavity molding process, a single piece mold having a concave portion formed therein is filled with a liquid rubber or plastic material, and the mold is inserted in an oven to cure the material. After curing, the finished product is removed from the mold. These open cavity molding processes of the prior art are relatively inexpensive and are particularly useful for manufacturing substantially flat thin products including floor mats, such as those typically used in automobiles and other vehicles. In typical open cavity molding processes, a single color of material is used to make single color products.

Products manufactured using open cavity molding processes typically have one smooth side, formed from the top surface of the material in the mold, and one featured side having a number of contoured features formed therein by contours in the bottom surface of the concave portion of the mold. For typical floor mats manufactured using the prior art processes described above, the bottom surface of the floor mat is substantially smooth, and the top surface has a number of contours or features that provide a textured surface. For floor mats and other products, it is sometimes desirable to have features formed on the top and bottom surfaces of the products, and to provide products having multiple colors. While it is possible to produce such products using processes other than open cavity molding, such as injection molding, these other processes are typically more complex and therefore more expensive than open cavity molding. It is also sometimes desirable to incorporate fabric into a portion of the top surface of the product to provide, for example a carpeted section of a floor mat.

SUMMARY OF THE INVENTION

In one general aspect, the present invention features a molding process for producing a molded product using a mold having a lower plate and an upper plate. The molding process includes steps of filling a first cavity of the lower plate with a molding material of a first color, placing the upper plate on top of the lower plate such that a convex portion of the upper plate extends into the first cavity of the lower plate and contacts the molding material in the lower plate, and curing the molding material.

The convex portion of the upper plate can have a plurality of convex sections and a plurality of concave sections, and the convex portion of the upper plate can be placed in the material such that the convex sections contact the material and force the material to flow into the concave sections of the upper plate. The step of curing can occur before or after the step of placing. The method can further include a step of filling a second cavity in the lower plate with a liquid molding material of a second color. The step of filling the second cavity can be performed before the step of filling the first cavity. The method can include a step of adding carpet material to the molded product. The method can also include a step of clamping the upper plate to the lower plate.

Another general aspect of the present invention is directed to an apparatus for producing a molded product using a material. The apparatus includes a bottom plate having an upper mating surface. The upper mating surface has a cavity to receive the material. The cavity has bottom surface containing a plurality of concave areas to form contoured features in a first surface of the molded product. The apparatus can further include a top plate having a top surface and a bottom mating surface. The bottom mating surface can be constructed and arranged to mate with the upper mating surface of the bottom plate. The bottom mating surface can have a convex section arranged to extend into the cavity to contact liquid material in the cavity. A bottom surface of the convex section of the top plate can have a plurality of convex sections to contact the liquid material in the cavity to form features in a second surface of the molded product. The top plate can have a plurality of holes extending from the bottom surface of the convex section to the top surface of the top plate. The holes and the convex sections of the top plate can be constructed and arranged such that material in the cavity is forced into the holes by the convex sections. At least one of the convex sections on the top plate can be in the shape of a pyramid having four base edges forming a polygon, the polygon having four corner points, and one of the holes can be located at each corner point of the pyramid. The top surface of the top plate can have a concave section that captures material forced through the holes by the convex sections.

Another general aspect of the present invention is directed to an apparatus for producing a molded floor mat. The molded floor mat has an upper surface and a lower surface. The apparatus includes means for forming concave and convex features on the upper surface of the floor mat and means for forming convex features on the lower surface of the floor mat.

The means for forming concave and convex features on the upper surface of the floor mat can include means for molding a first part of the upper surface of the floor mat using a first color of material and means for molding a second part of the upper surface of the floor mat using a second color of material. The apparatus can further include means for adding carpeting to the upper surface of the floor mat.

BRIEF DESCRIPTION OF THE DRAWINGS

For a better understanding of the present invention, reference is made to the drawings which are incorporated herein by reference and in which:

FIG. 7 is a cross sectional side view taken along line 7—7 of the bottom plate shown in FIG. 6;

FIG. 10 shows a cross-sectional side view taken along line 10—10 of the top plate of FIG. 8;

FIG. 11 shows an area C of the top plate of FIG. 10 in greater detail;

FIG. 19 is a top view of a plug used with the top plate shown in FIG. 18;

FIG. 20 is a cross-sectional side view of the plug of FIG. 19 taken along line 20—20;

FIG. 21 is a cross-sectional side view of the top plate of FIG. 18 taken along line 21—21;

DETAILED DESCRIPTION

Embodiments of the present invention are described below with reference to automobile floor mats. As understood by those skilled in the art, the processes and apparatuses described below may be used for manufacturing molded products other than floor mats using a number of different materials.

Figure 1:
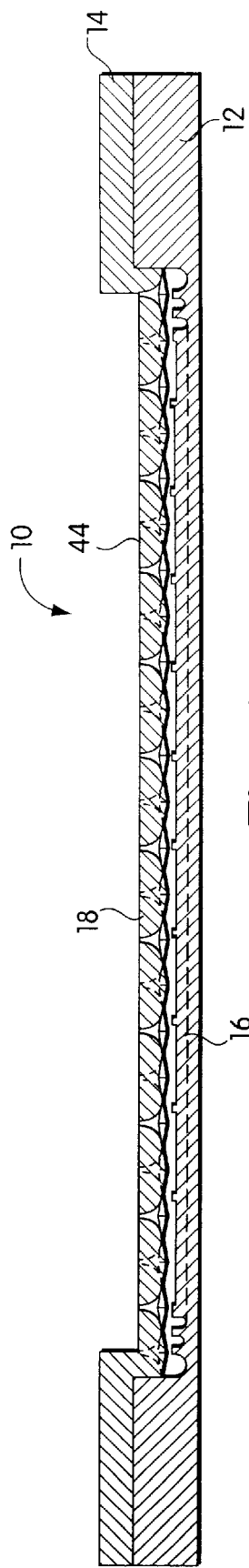
FIG. 1 is a cross-sectional side view of a mold in accordance with one embodiment of the present invention.
Figure 2:
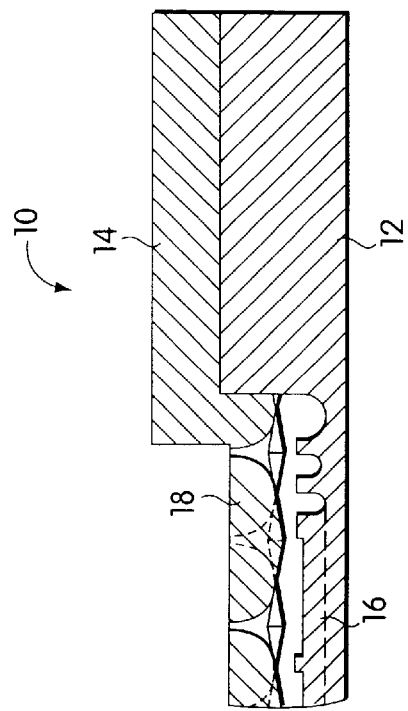
FIG. 2 shows area A of the mold of FIG. 1 in greater detail.
Figure 3:
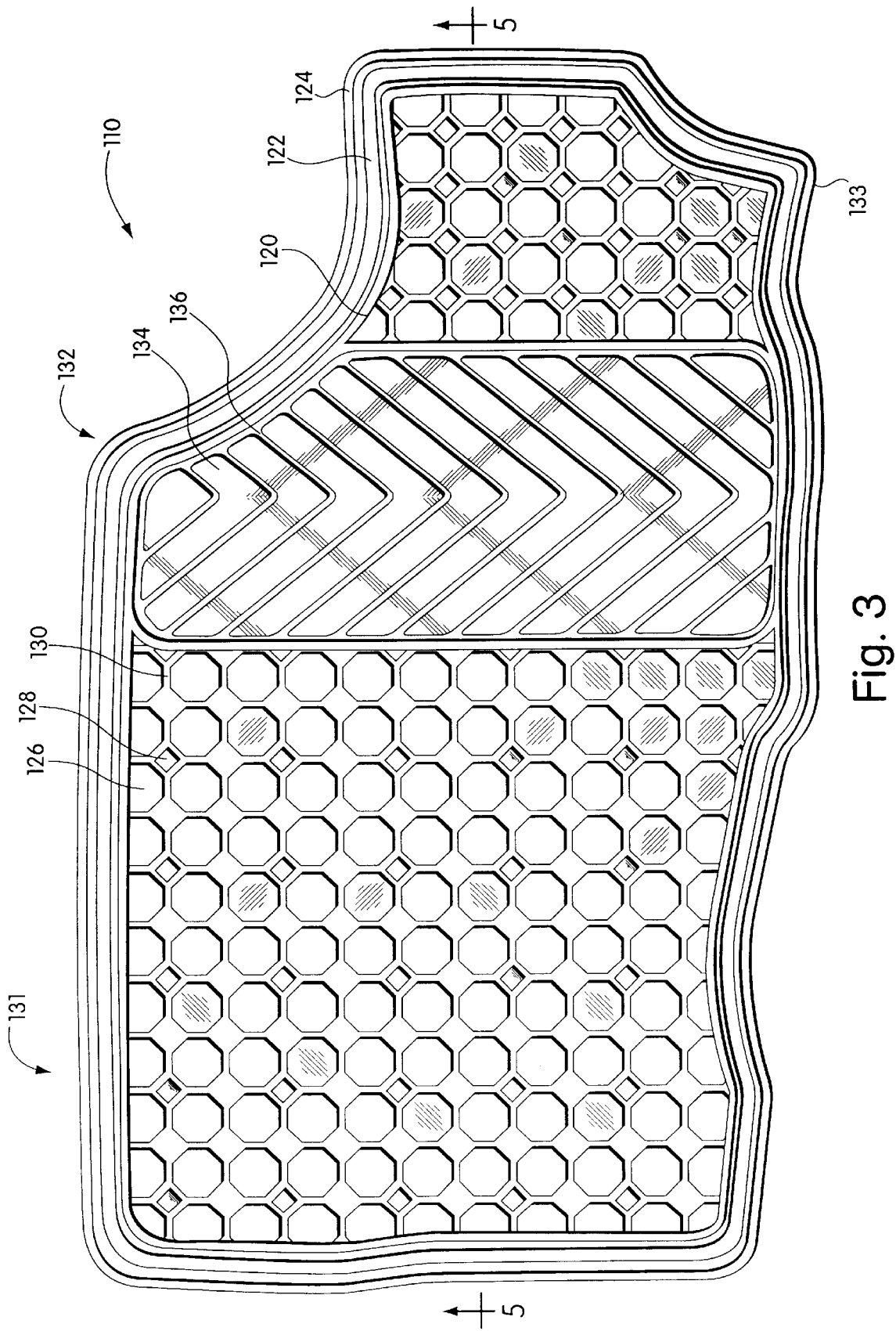
FIG. 3 is a top view of an automotive floor mat produced using the mold shown in FIG. 1.
Figure 4:
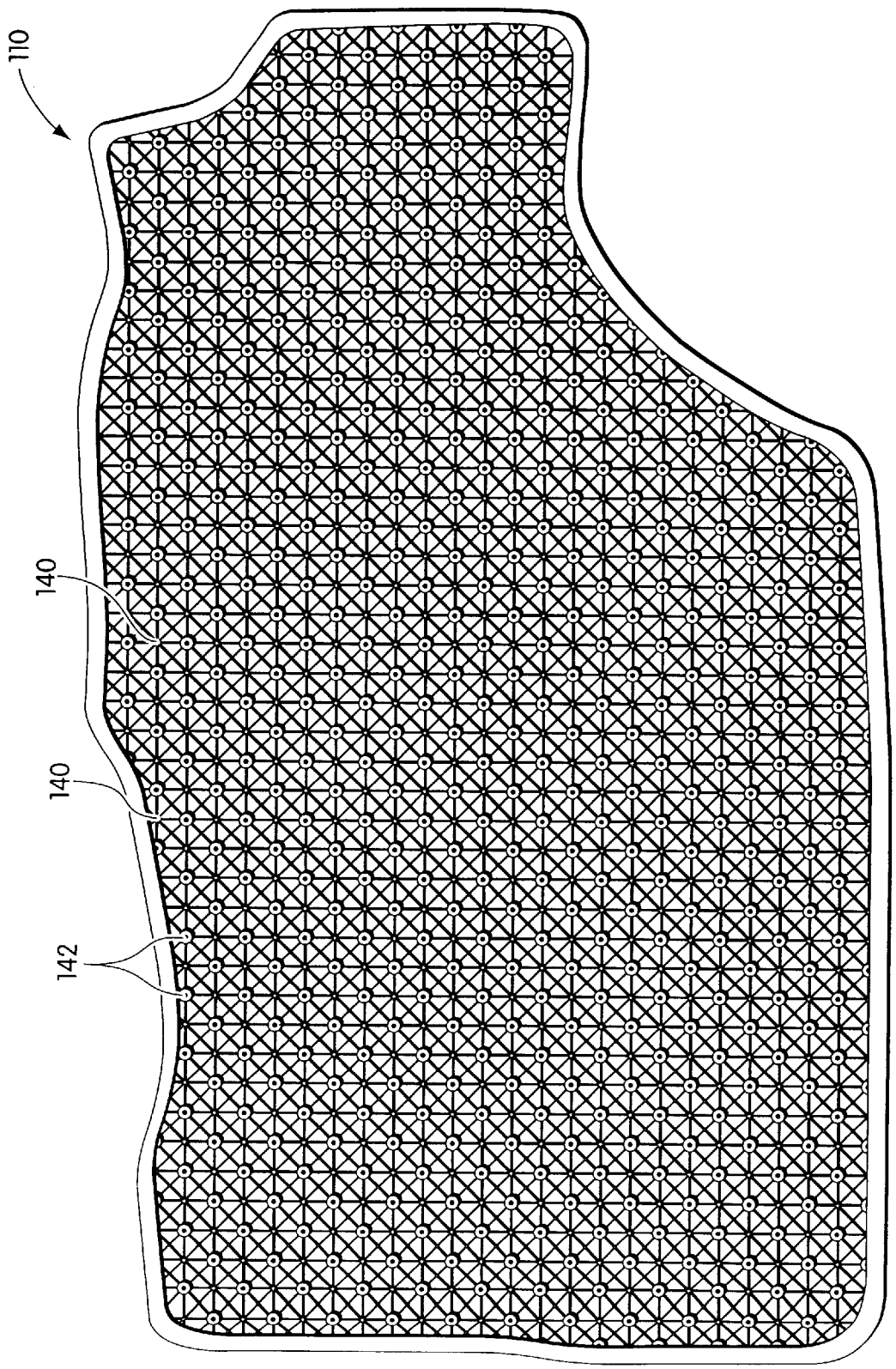
FIG. 4 is a bottom view of the automotive floor mat of FIG. 3.
Figure 5:
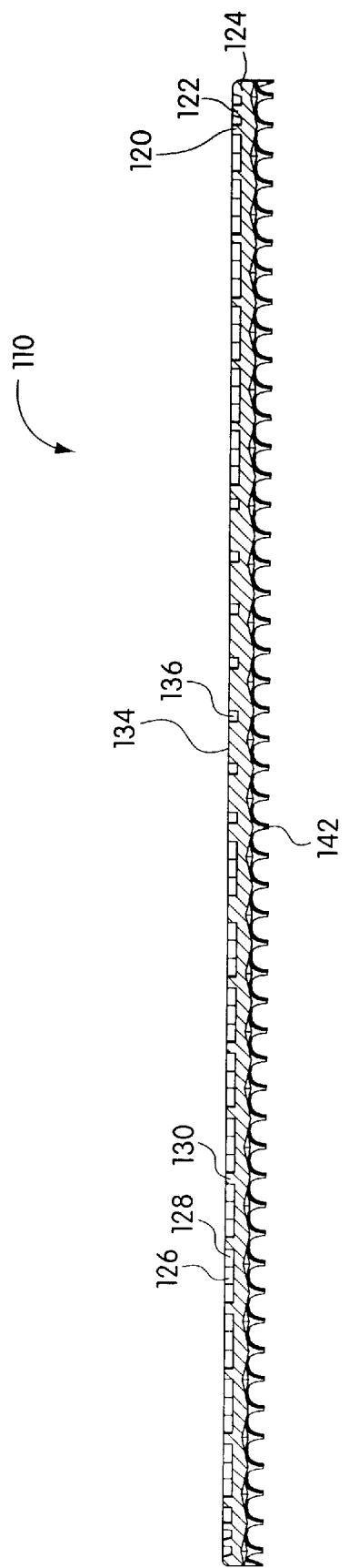
FIG. 5 is a cross-sectional side view taken along line 5—5 of the automotive floor mat of FIG. 3.

FIG. 1 is a cross-sectional side view of an open cavity mold 10 used with embodiments of the present invention. FIG. 2 shows a portion A of the open cavity mold 10 in greater detail. The open cavity mold 10 includes a bottom plate 12 and a top plate 14. The bottom plate 12 includes a concave section 16, and the top plate 14 includes a convex section 18 that extends into the concave section 16 of the bottom plate. In the embodiment shown in FIG. 1, the mold 10 is designed for producing automobile floor mats having an overall shape defined by the perimeter of the concave section 16. FIGS. 3–5 show an automobile floor mat 110 produced using the mold 10.

Figure 6:
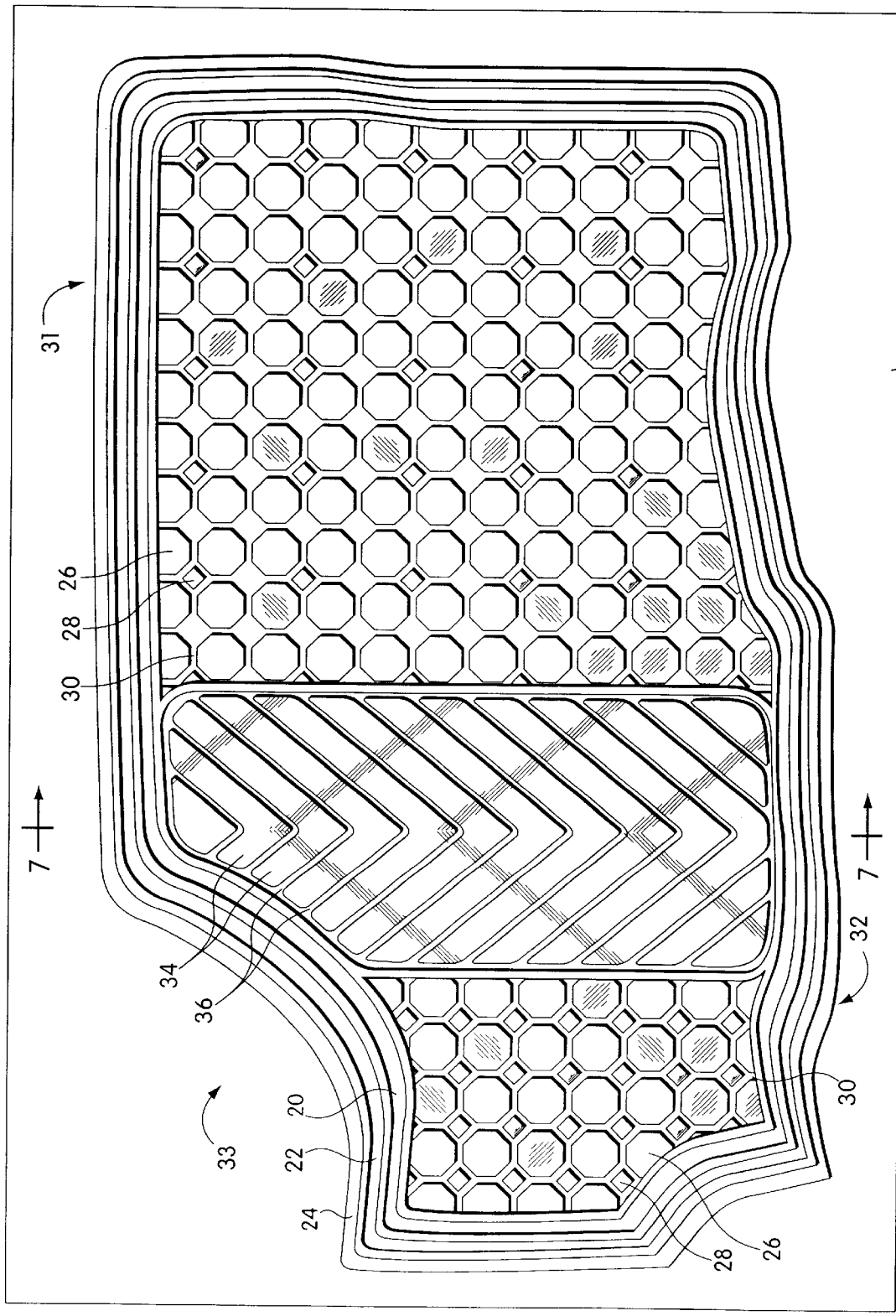
FIG. 6 is a top view of a bottom plate used in the mold shown in FIG. 1.
Figure 9:
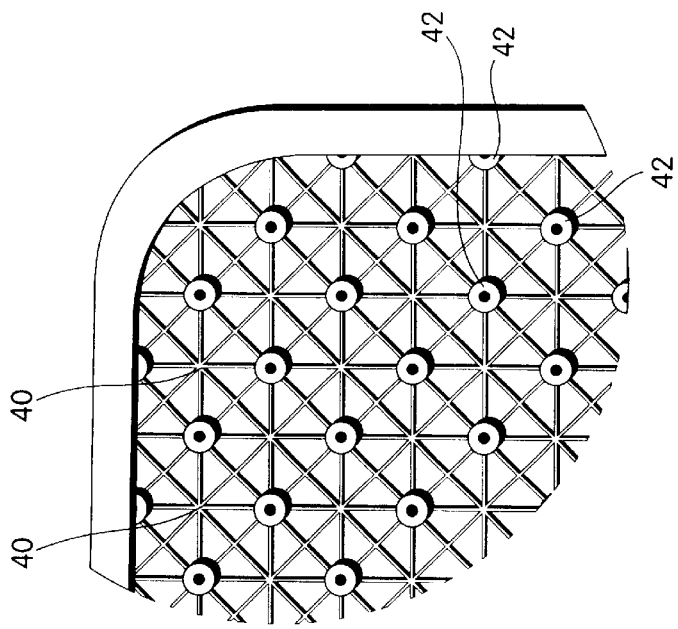
FIG. 9 shows an area B of the top plate of FIG. 8 in greater detail.
Figure 8:
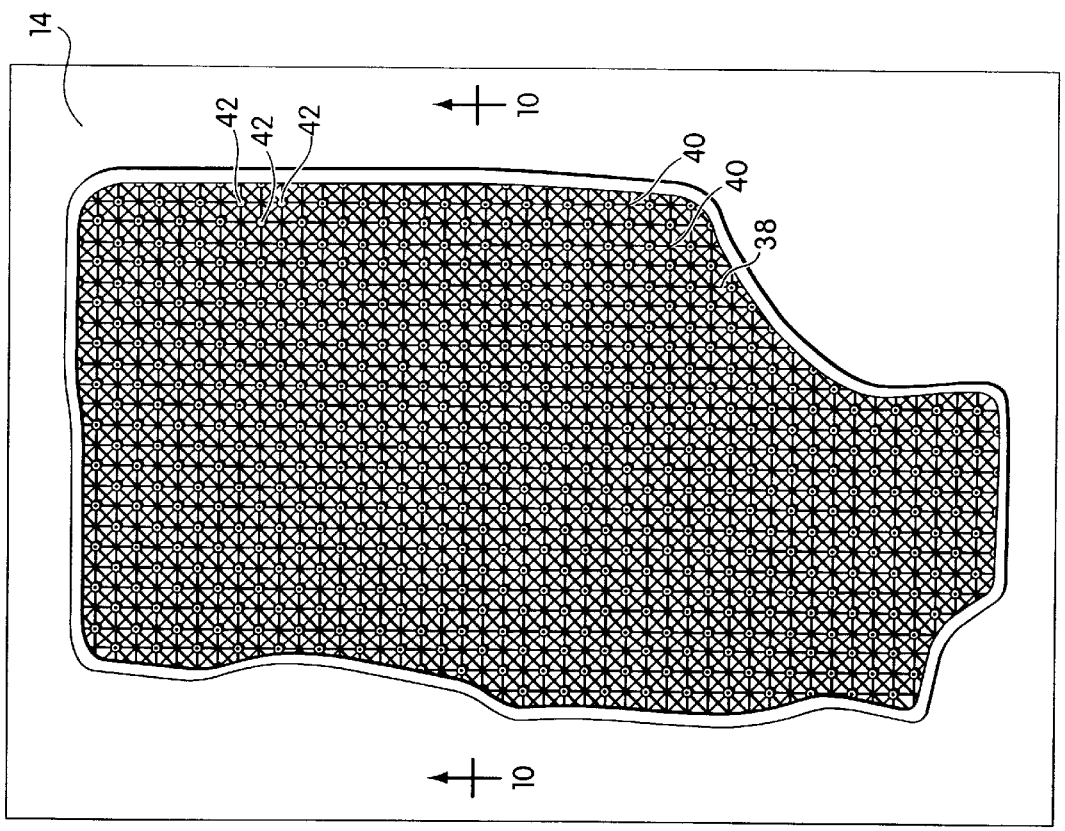
FIG. 8 is a bottom view of a top plate used in the mold shown in FIG. 1.

FIG. 6 shows a top view of the bottom plate 12 of the open cavity mold 10, and FIG. 7 shows a cross-sectional side view of the plate 12 taken along line 7—7 of FIG. 6. Around the base of the cavity 12 are three concave rings 20, 22 and 24 that define three convex ridges 120, 122 and 124 in the floor mat 110. As discussed below, in embodiments of the present invention, each of the rings 120, 122 and 124 may be made from a different color of material. On the bottom surface of the concave section 16 of the bottom plate 12, are a rear section 31, a heel section 32 and a front section 33 that respectively correspond to rear section 131, heel section 132 and front section 133 of the floor mat 110. Contained within the rear section 31 and the front section 33 of the bottom plate are a number of octagon shaped convex sections 26 and square convex section 28 that form respectively concave sections 126 and 128 in the floor mat 110. Disposed between each of the convex sections 26 are concave wells 30 that form ridges 130 in the floor mat 110. Section 32 of bottom plate 12 has valleys 34 and ridges 36 that respectively form raised ribs 134 and channels 136 in the floor mat 110.

The top plate 14 will now be described in greater detail with reference to FIGS. 8–11. The convex section of the top plate 18 is designed to fit within the concave section 16 of the bottom plate 12. The convex section has a lower surface 38 having a number of contoured features contained therein for forming corresponding contoured features in the floor mat 110. The lower surface 38 has pyramid-shaped convex sections 40 that are designed to extend into material in the concave section of the bottom plate when the top plate is placed into the bottom plate as described below in further detail. The pyramid-shaped convex sections 40 cause concave sections 140 to be formed in the floor mat 110. At the bottom corners of each of the pyramid-shaped convex sections are air holes 42 that extend through the top plate 14 from the bottom surface 38 of the convex section 18 to the top surface 19 of the convex section. As described below, each of the air holes allows air to exit the area between the top plate and the bottom plate as the top plate is lowered into the bottom plate. In addition, the air holes 42 are designed to be filled with material to create nubs 142 on the bottom surface of the floor mat 110.

The top plate 14 has an upper concave section 44 (see FIG. 1) on the top surface of the top plate opposite the convex section 18. The upper concave section forms a well for containing any excess material that flows through the air slots 42 when the top plate is placed into the bottom plate.

Figure 12:
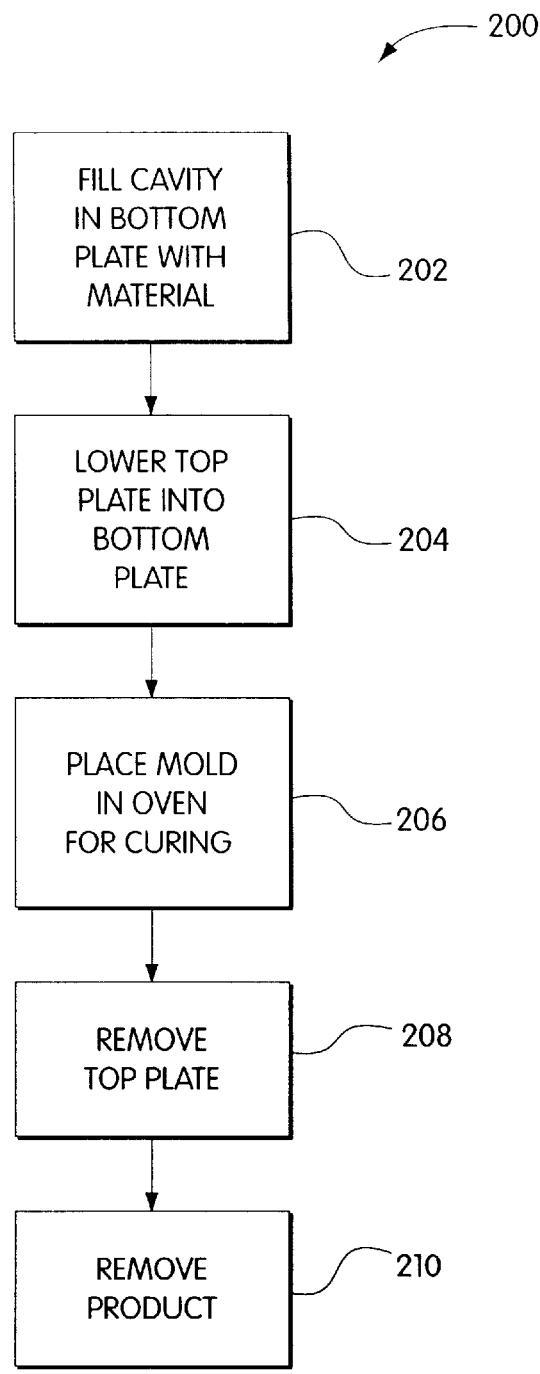
FIG. 12 is a flow chart of a method for producing molded products in accordance with one embodiment of the present invention.

A method 200 in accordance with one embodiment of the present invention for producing the floor mat 110 using the mold 10 will now be described with reference to FIG. 12. In a first step 202, the concave section 16 of the bottom plate 12 is filled with a predetermined quantity of liquid rubber or plastic material. In one embodiment, the material used is polyvinyl chloride. However in other embodiments, other materials such as silicone can also be used. During the first step, the top plate 14 is separated from the bottom plate. Next, in step 204, the top plate is lowered into the bottom plate so that the convex section 18 contacts the material in the concave section 16. The pyramid-shaped convex sections 40 on the bottom surface of the top plate contact the material as the top plate is lowered, and any air trapped between the top plate and the bottom plate is evenly forced out of the air holes 42. As the top plate is lowered, the convex sections 40 force material to flow into the air holes 42.

In embodiments of the invention, the quantity of material used for filling the lower plate is selected so that material completely fills all of the air holes 42. If excess material is used, the excess material flows into the upper concave section 44. After the top plate has been lowered into the bottom plate, then in step 206, the mold 10 is placed into an oven to cure the material in the mold. The temperature of the oven and the curing time used depend on the material selected and the type of product being made. In some embodiments, the top plate is clamped to the bottom plate during the curing process to ensure that the top plate does not move with respect to the bottom plate when the material is cured. After the curing time, the mold 10 is removed from the oven, and in step 208, the top plate is removed from the bottom plate. Next, in step 210, the product is removed from the lower plate.

It is sometimes desirable to add a second color to a molded product. In typical prior art processes, a second color is added by painting the molded product after curing. In embodiments of the present invention, a material having a second color can be added by filling one or more of the rings 20, 22 and 24 with a material having the second color prior to step 202 of the process 200. If the material used for the second color (or other additional colors) is less viscous than the material used for the first color, then the first color may be poured directly on top of the second color in the mold. If the material used for the second color is not more viscous than that used for the first color, then in one embodiment, the second color is cured in the oven prior to adding the first color. The top plate may be placed on top of the bottom plate when the second color is cured.

As understood by one skilled in the art, products having more than two colors can be produced using three or more different-colored materials, and the use of different-colored materials is not limited to the outer rings, but different-colored materials may be used in other areas of the bottom plate as well.

In embodiments of the present invention, the top plate and the bottom plate are made from aluminum, and can be manufactured relatively inexpensively and quickly using well-known machining techniques. In prior art injection molding techniques, the molds are typically made from steel and are considerably more expensive and require more time to manufacture than the top plate and the bottom plate of embodiments of the present invention.

In embodiments of the molding process described above, the top plate is added to the bottom plate prior to curing the material. In other embodiments, the top plate may be placed into the bottom plate either after the material is cured or after the material is partially cured. In these embodiments, it may be desirable to use clamps or a press to bring the plates together and force the convex section of the top plate into the material in the bottom plate.

The molding process described above provides several advantages and overcomes problems associated with prior art open cavity molding processes. The use of the convex sections 40 and air holes 42 allows air to evenly escape to prevent the creation of undesirable air pockets in the final product and also allows features such as nubs 142 to be formed on the bottom surface of a product. In typical prior art open cavity molding processes, features are formed on either the top surface or bottom surface of a product, but not on both surfaces as in embodiments of the present invention.

In the embodiments described above, pyramid-shaped convex sections 40 are used to evenly force air from between the plates and to create the nubs 142. In other embodiments, convex sections having other shapes, such as hemispherical, can be used in place of the pyramid-shaped convex sections.

Figure 13:
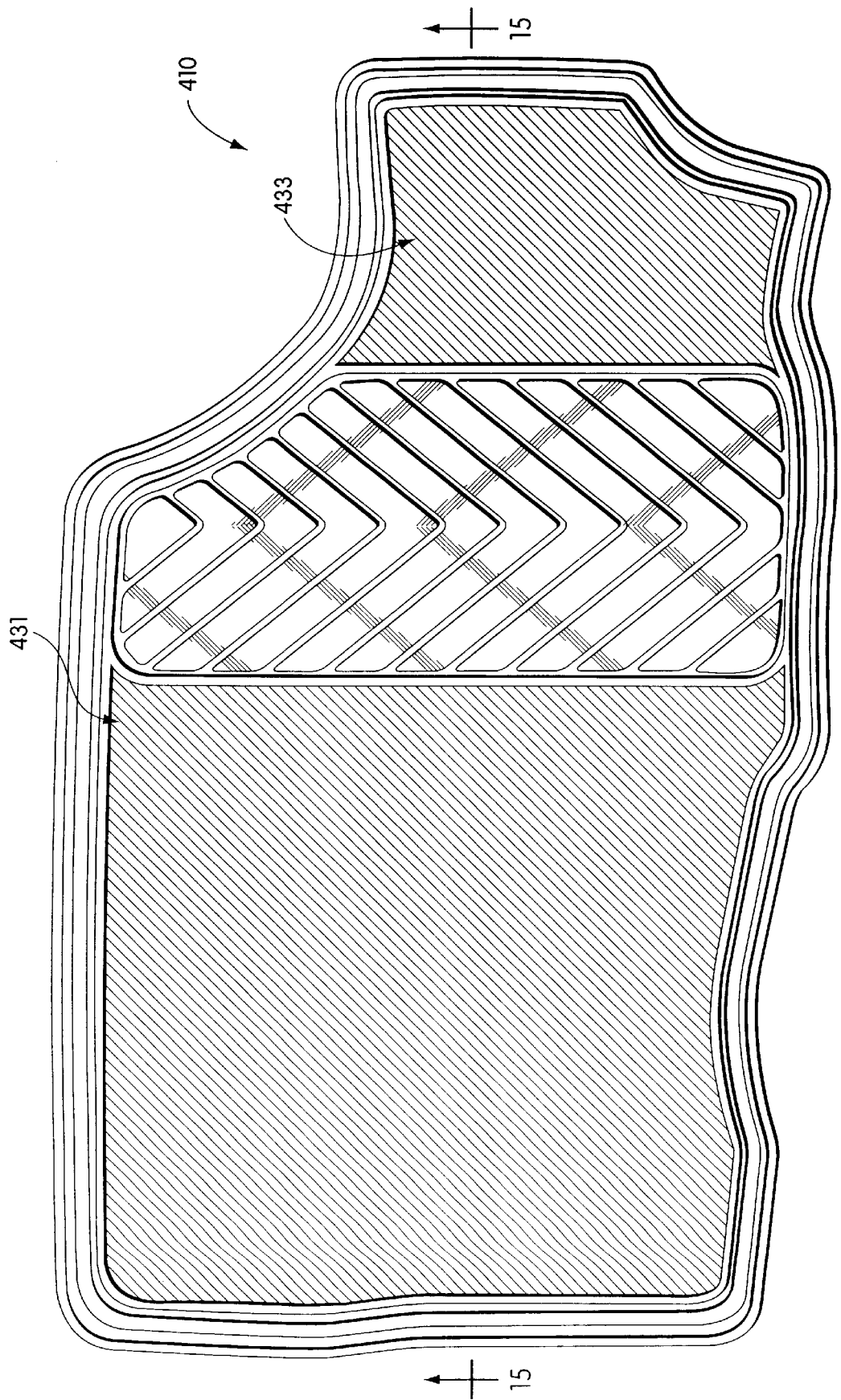
FIG. 13 is a top view of an automotive floor mat having carpet sections produced using a method of the present invention.
Figure 14:
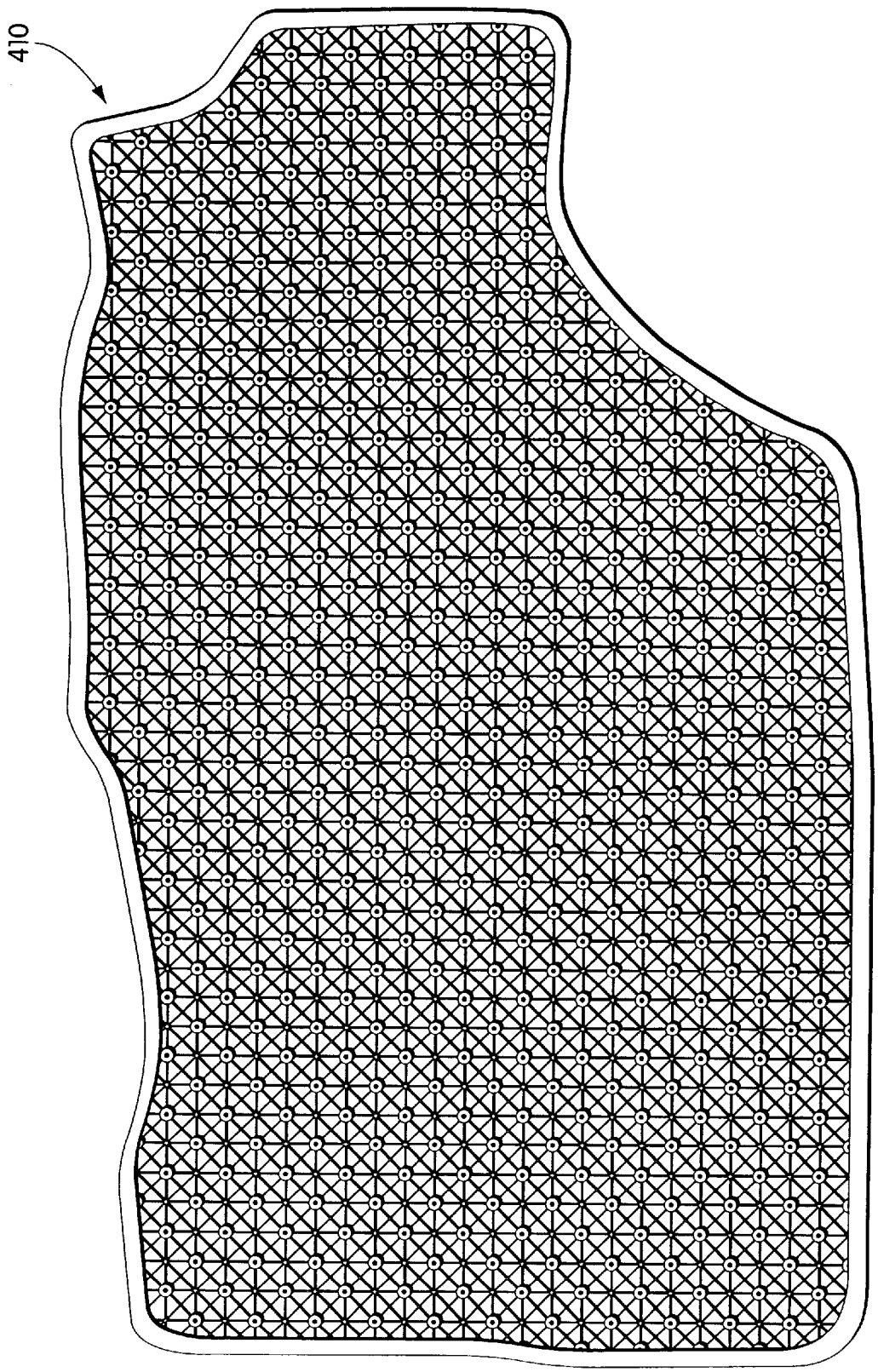
FIG. 14 is a bottom view of the automotive floor mat of FIG. 13.
Figure 15:
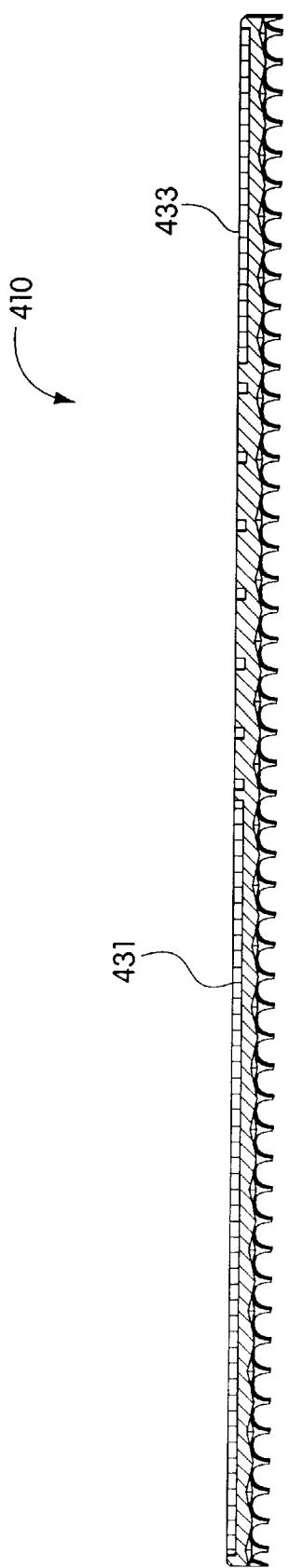
FIG. 15 is a cross-sectional side view taken along line 15—15 of the automotive floor mat of FIG. 13.

It is sometimes desirable to include carpeted sections in floor mats and other molded products. In another embodiment of the present invention, a method and apparatus is provided for producing floor mats having carpeted sections. One embodiment of a carpeted floor mat 410 produced using methods of the present invention is shown in FIGS. 13–15. The carpeted floor mat 410 is similar to floor mat 110 except that sections 131 and 133 of floor mat 110 have been replaced by carpeted sections 431 and 433 in floor mat 410. The method for producing the carpeted floor mat 410 in accordance with the present invention is similar to the method 200 described above with reference to FIG. 12 with a few exceptions.

Figure 16:
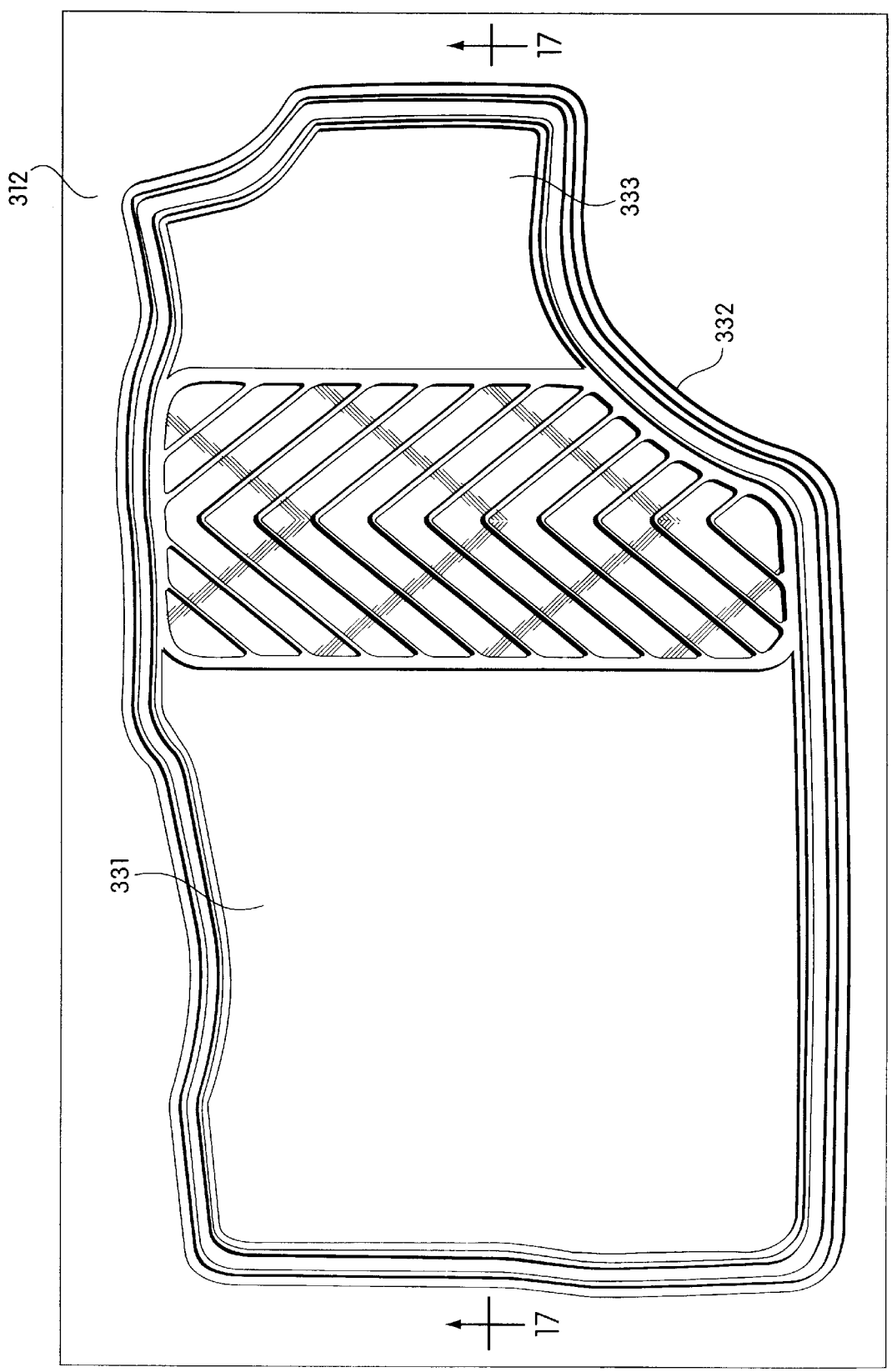
FIG. 16 is a top view of a bottom plate used to produce the automotive floor mat shown in FIG. 13.
Figure 17:
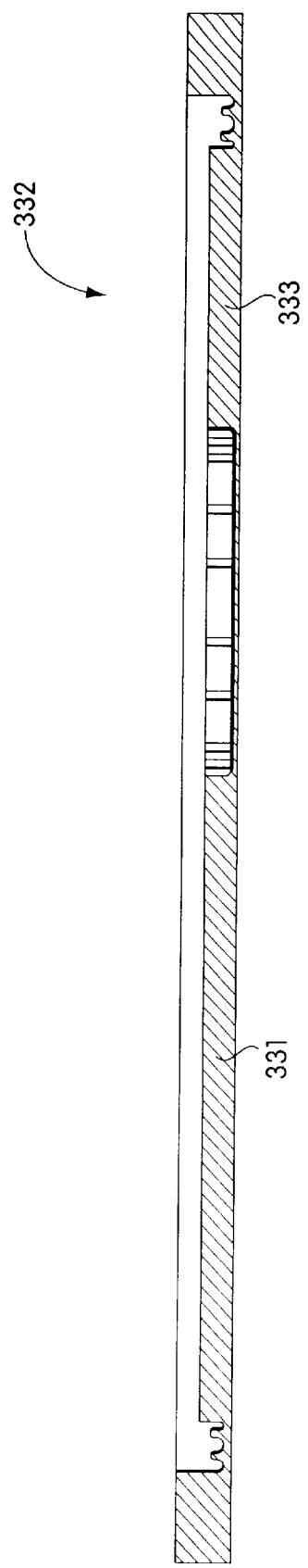
FIG. 17 is a cross-sectional side view of the bottom plate of FIG. 16 taken along line 17—17.
Figure 18:
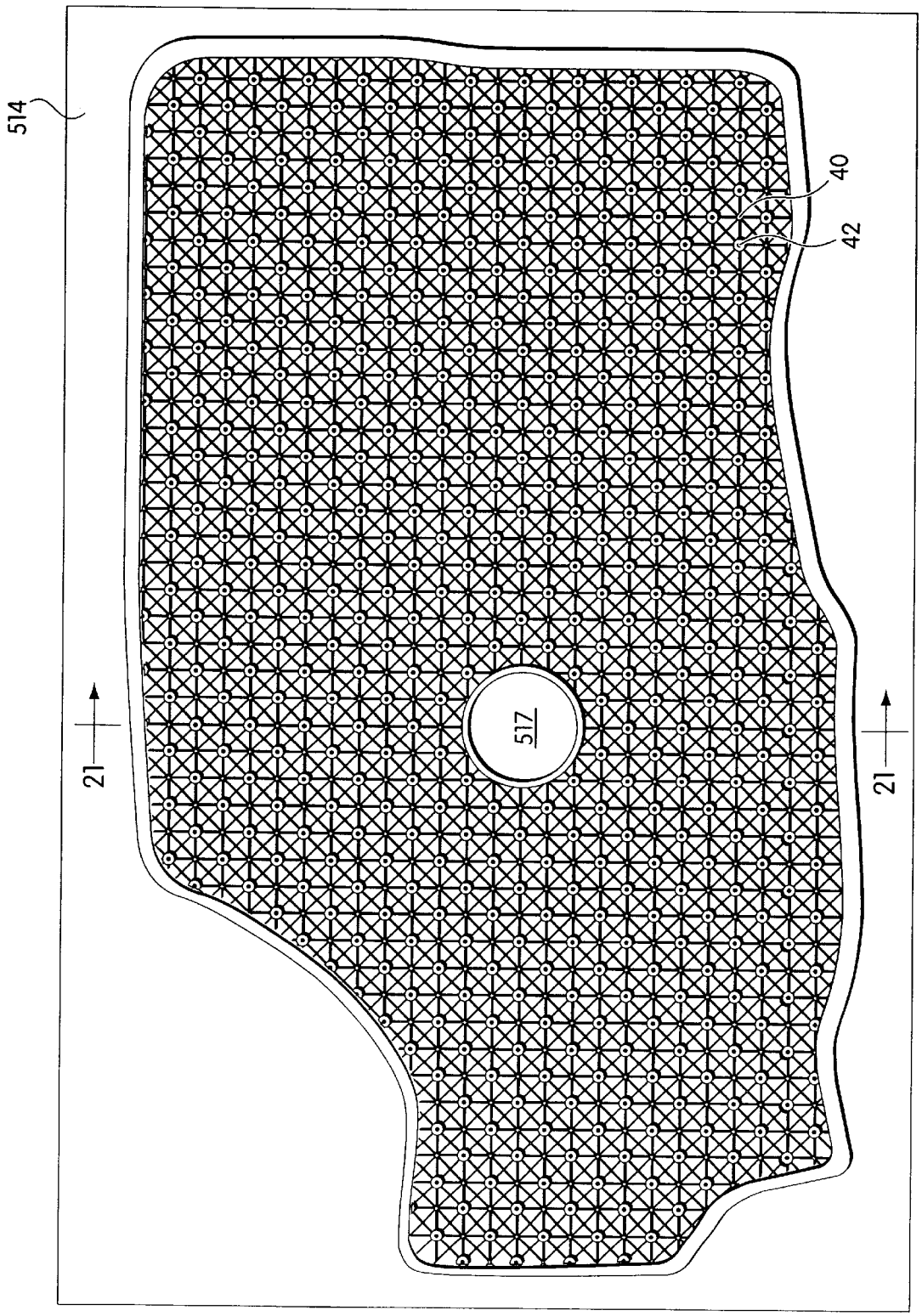
FIG. 18 is a top view of a top plate in accordance with one embodiment of the present invention having a hole through which material can be injected.

The bottom plate 12 used with method 200 is replaced with bottom plate 312 shown in FIGS. 16 and 17 to produce the carpeted floor mat 410. Bottom plate 312 is similar to bottom plate 12 and has sections 331, 332 and 333 corresponding to sections 31, 32 and 33 of bottom plate 12. Bottom plate 312 differs from bottom plate 12 in that sections 331 and 333 do not contain wells and ridges as in sections 31 and 33. Sections 331 and 333 are convex sections that create wells in the floor mat 410 that contain carpeted sections 431 and 433.

Using bottom plate 312 and top plate 14, the carpeted floor mat can be produced using method 200 with an additional step. After the floor mat is removed from the mold in step 210, pieces of carpet, sized to fit within wells created by sections 331 and 333 of the bottom plate, are adhered to the bottom surface of the wells. The pieces of carpet may be adhered to the bottom surface of the wells using an adhesive or double sided tape. Alternatively, the pieces of carpet may be sewn or riveted into the product. The pieces of carpet used to create the carpeted sections may be obtained from one of several carpet manufacturers depending on the style carpeting that is desired.

In embodiments of the present invention, a second color of material can be added to the carpeted floor mat 410 using the same method described above for floor mat 110. The second color of material can be chosen to match the color of the carpet sections used in the floor mat 410. In one embodiment, an emblem, or some other feature, may be made from the second color, and the emblem may be positioned on the upper surface of the floor mat such that it extends through a hole in the carpeted section.

As described above, when adding a second material having a second color to a product, in some embodiments of the present invention, it may be desirable to cure the second material prior to adding the first material having the first color. In these embodiments, it may be desirable to cure the second material with the top plate in place over the bottom plate. In one embodiment of the present invention, which will now be described with reference to FIGS. 18–21, a top plate 514 of an open cavity mold includes a removable plug 515 to allow filling the mold with a first color of material after the second color has been cured without removing the top plate from the bottom plate. The top plate 514 is substantially identical to the top plate 14 described above, except that the top plate 514 includes a hole 517 for receiving the plug 515. The same reference numbers are used to identify similar features of top plates 14 and 514. Top plate 514 is designed to mate with bottom plate 12 in a manner similar to top plate 14.

A process in accordance with one embodiment of the present invention for using the top plate 514 in conjunction with the bottom plate 12 to manufacture molded products using a first material of a first color and a second material of a second color will now be described. With the top plate 514 removed from the bottom plate 12, the second material is poured into one or more cavities in the top surface of the bottom plate. The top plate 514 is then placed on top of the bottom plate 12 and the combination of the top plate and the bottom plate is placed in an oven to cure the second material in the mold. After the second material has fully cured, or in some embodiments has partially cured, the combination of the top plate and the bottom plate is removed from the oven. The plug 515 is then removed from the top plate 514, and the first material is injected into the hole 517. In some embodiments, to force the material into each of the holes 42, the material is injected into hole 517 using a pressurized container having an outlet adapter designed to mate with the top plate at the hole 517.

After the first material has been injected, the plug 515 is inserted back into the hole 517. The combination of the top plate and the bottom plate is then placed back into the oven to cure the first material. After curing, the product in the mold can be removed from the mold in the same manner as described above, and if desired, carpet material can be added to the product.

As understood by one skilled in the art, in embodiments of the present invention that utilize the top plate 514, more than two colors may be incorporated into products by filling additional cavities in the bottom plate with materials having additional colors.

Figure 22:
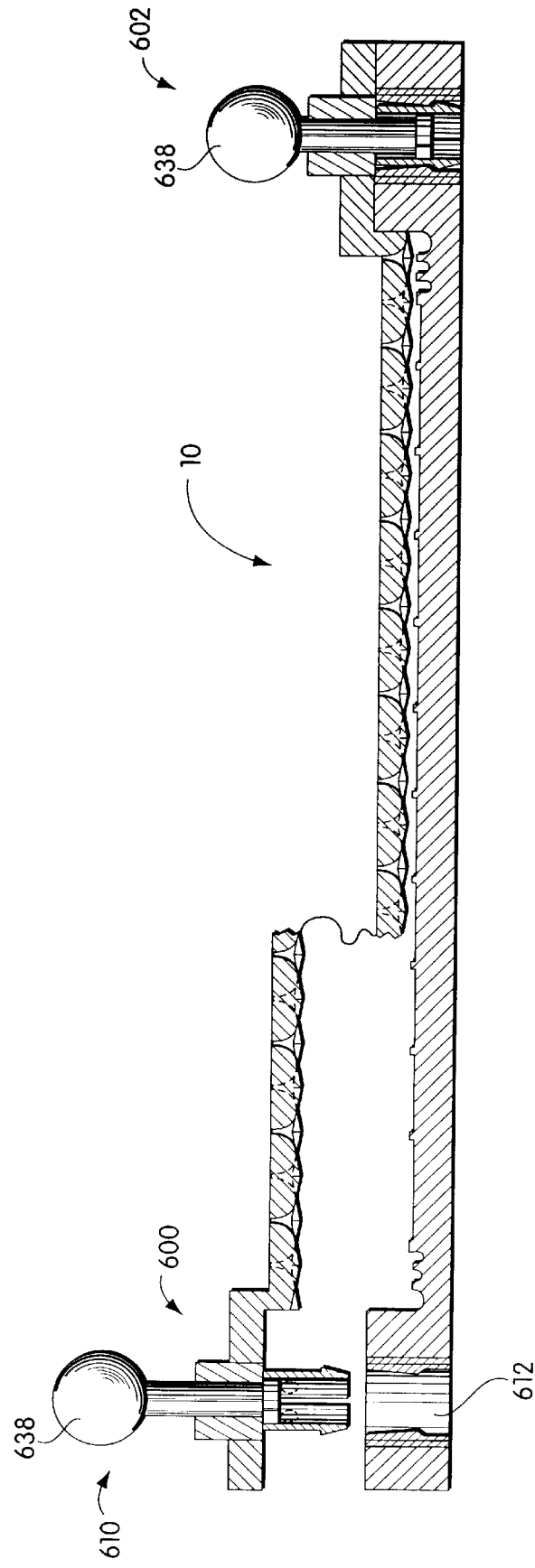
FIG. 22 is a cross-sectional side view of a mold in accordance with one embodiment of the present invention having clamping assemblies for clamping the top plate to the bottom plate.
Figure 27:
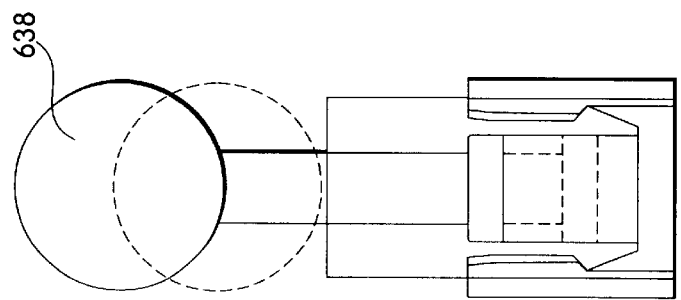
FIG. 27 is a side view of one of the clamping assemblies of FIG. 22.
Figure 25:
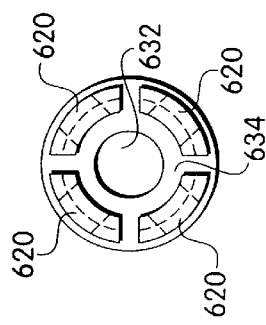
FIG. 25 is a bottom view of the top insert of FIG. 24.
Figure 26:
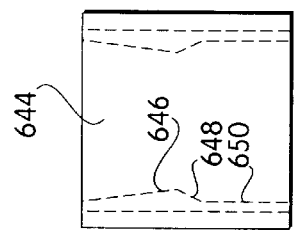
FIG. 26 is a side view of a bottom insert of the clamping assemblies of FIG. 22.
Figure 23:
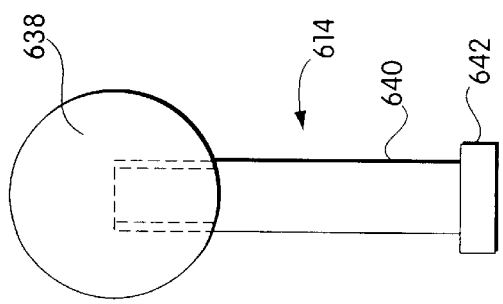
FIG. 23 is a side view if a plunger used in the clamping assemblies of FIG. 22.
Figure 24:
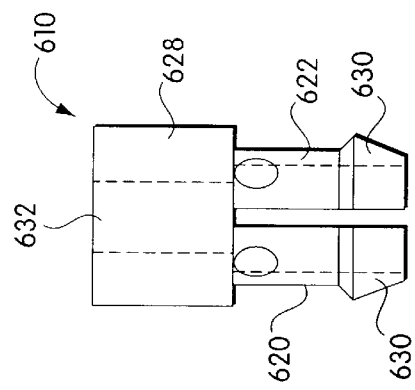
FIG. 24 is a side view of a top insert of the clamping assemblies of FIG. 22.

As discussed above, in some embodiments of the present invention, it may be desirable to clamp the bottom plate to the top plate prior to curing the material. In one embodiment of the present invention, which will now be described with reference to FIGS. 22–27, clamping assemblies are used to clamp the top plate 14 to the bottom plate 12. FIG. 22 shows a cross-sectional side view of the open cavity mold 10 with two clamping assemblies 600 and 602 incorporated into the mold. In FIG. 22, the top plate 14 of the mold 10 is split to show a first one of the clamping assemblies 600 in a disengaged position and to show a second one of the clamping assemblies 602 in an engaged position. The clamping assembly 600 is described below and shown in further detail in FIGS. 23–27, it being understood that clamping assembly 602 is substantially identical to clamping assembly 600. In embodiments of the present invention, the number of clamping assemblies used in open cavity molds may be more or less than two depending primarily on the size of the mold.

The clamping assembly 600 includes a top insert 610, a bottom insert 612, and a plunger 614. The top insert 610 is mounted in a hole in the top plate 14, and the bottom insert 612 is mounted in a hole in the bottom plate 12. The holes in the top and bottom plates for the inserts are in alignment, when the top and bottom plates are aligned. The plunger 614 is disposed in the top insert and is movable between a disengaged position shown in solid lines in FIG. 27 and an engaged position shown in dashed lines in FIG. 27. In one embodiment, the top insert, bottom insert and plunger are made from steel, however in other embodiments, different materials could be used.

The top insert 614 has four arcuate pliable tabs 620 that extend from a cylindrical section 628. Each of the tabs 620 has a tapered end section 630. The top insert includes a cylindrical hollow section 632. In addition, a substantially cylindrical hollow section 634 is formed by the four tabs 620.

The plunger 614 includes a knob 638, a cylindrical shaft 640 and a disc-shaped end section 642. The shaft 640 has an outer diameter that is slightly less than the diameter of the cylindrical section 628 of the top insert. The end section 642 has an outer diameter that is greater than the diameter of the cylindrical section 628, and slightly less than the diameter of the hollow section 634.

The bottom insert 612 is cylindrical shaped and includes a hollow inner chamber 644. The inner chamber 644 has an upper surface 646 that slopes inwardly from top to bottom, a middle surface 648 that slopes outwardly from top to bottom and a lower vertical surface 650.

The clamping assembly 600 operates as follows. When the top plate 12 is to be lowered onto the bottom plate 14, the knob 638 is lifted to place the plunger in the raised position. Clamping assembly 600 is shown with the plunger 614 in the raised position in FIG. 22. As the top plate is lowered onto the bottom plate, the tabs 620 of each top insert are lowered into the hollow chamber 644 of the corresponding bottom insert. When the tabs are lowered into the hollow chamber, the tapered end section 630 of each tab contacts the sloped upper surface 646 of the bottom insert causing each of the tabs to move inward slightly. When the tabs are fully inserted into the hollow chamber, such that the tapered end sections are adjacent the vertical surface 650, the tabs return to their original position. The plunger is then pushed downward to the lower position. Clamping assembly 602 is shown with the plunger 614 in the lowered position in FIG. 22. With the plunger 614 in the lowered position, the tabs are locked in place in the hollow chamber. The plunger prevents the tabs from bending inwardly as is necessary to move the tabs past the sloped upper surface 646.

When the top plate is to be removed from the bottom plate after curing of the material, the knobs of each of the clamping assemblies are lifted to the upper position. With the knobs lifted, the tabs can be removed from the hollow chamber to separate the top plate from the bottom plate. In one embodiment of the present invention, the knobs are designed to mate with automated handling equipment allowing the knobs to be moved between the upper position and the lower position using the automated handling equipment. In addition, the automated handling equipment can be used to lower the top plate onto the bottom plate and to lift the top plate from the bottom plate using the knobs.

In embodiments of the present invention described above, the material used in molding processes has been described as liquid material. As understood by those skilled in the art, the material used need not be in liquid form, but may be in paste form or some other form having sufficient viscosity to fill all cavities in the top and bottom plates.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A floor mat comprising:
    a top surface having a plurality of concave sections; and
    a bottom surface opposite the top surface and having a plurality of concave sections, the concave sections of the bottom surface having bottom corners with nubs extending from the bottom corners.

2. The floor mat of claim 1, wherein the concave sections of the bottom surface have a pyramid shape.

3. The floor mat of claim 1, wherein a portion of the top surface includes a carpeted section.

4. The floor mat of claim 1, wherein a first portion of the top surface is a first color, and a second portion of the top surface is a second color, the first color being different from the second color.

5. The floor mat of claim 1, further including a plurality of concentric convex ridges defined on the perimeter of the top surface of the floor mat.

6. The floor mat of claim 1, wherein the top surface further includes:
    a front section;
    a heel section; and
    a rear section.

7. The floor mat of claim 6, wherein the front and rear sections each include the plurality of concave sections separated by a plurality of convex sections.

8. The floor mat of claim 7, wherein each of the plurality of concave sections is substantially octagon shaped.

9. The floor mat of claim 6, wherein the heel section includes a plurality of raised ribs separated by a plurality of channels.

10. The floor mat of claim 9, wherein the plurality of raised ribs substantially form a herring bone pattern.

11. The floor mat of claim 6, wherein the front section and the rear section include a well portion.

12. The floor mat of claim 11, wherein a carpet is retained in the well portion of the front section and the well portion of the rear section by an adhesive.

13. A floor mat comprising:
    a top surface having a plurality of concave sections separated by a plurality of convex surfaces; and
    a bottom surface opposite the top surface and having a plurality of concave pyramid shaped sections, the concave pyramid shaped sections of the bottom surface having bottom corners with nubs extending from the bottom corners.

14. The floor mat of claim 13, wherein a portion of the top surface includes a carpeted section.

15. The floor mat of claim 13, further including a plurality of concentric convex ridges defined on the perimeter of the top surface of the floor mat.

16. The floor mat of claim 13, wherein the top surface further includes:
    a front section;
    a heel section; and
    a rear section.

17. The floor mat of claim 16, wherein the front section includes the plurality of concave sections and the plurality of concave sections of the front section being substantially octagon shaped.

18. The floor mat of claim 16, wherein the rear section includes the plurality of concave sections and the plurality of concave sections of the rear section being substantially octagon shaped.

19. The floor mat of claim 16, wherein the heel section includes the plurality of concave sections and the plurality of concave sections of the heel section substantially forming a herring bone pattern.

20. The floor mat of claim 16, wherein the front and rear sections each include a well portion adapted to accept a carpet.

* * * * *

UNITED STATES PATENT AND TRADEMARK OFFICE
CERTIFICATE OF CORRECTION

PATENT NO. : 6,605,333 B2
DATED : August 12, 2003
INVENTOR(S) : Ferreira et al.

It is certified that error appears in the above-identified patent and that said Letters Patent is hereby corrected as shown below:

<u>Title page,</u>
Item [56], References Cited, U.S. PATENT DOCUMENTS,
"2,082,918 A    9/1937   Wilhelmy" should read
-- 2,082,928 A    6/1937   Wilhelmy --

Signed and Sealed this

Seventeenth Day of February, 2004

JON W. DUDAS
*Acting Director of the United States Patent and Trademark Office*